United States Patent [19]

Barwig et al.

[11] 3,801,802

[45] Apr. 2, 1974

[54] INFORMATION STORAGE HAVING MONITORED FUNCTIONS

[75] Inventors: Karlhorst Barwig; Roland Walker, both of Munchen, Germany

[73] Assignee: Siemens Aktiengesellschaft, Berlin and Munich, Germany

[22] Filed: Oct. 24, 1972

[21] Appl. No.: 300,324

[30] Foreign Application Priority Data

Oct. 25, 1971 Germany .......................... 2153116

[52] U.S. Cl. .................. 235/153 AM, 340/174 ED

[51] Int. Cl. ...................... G11c 29/00, G06f 11/10

[58] Field of Search ... 235/153 AM; 340/146.1 AG, 340/174 ED, 173 R

[56] References Cited

UNITED STATES PATENTS

| | | | |
|---|---|---|---|
| 3,122,724 | 2/1964 | Felton et al. | 340/174 ED |
| 3,566,093 | 2/1971 | Joyce et al. | 340/146.1 AG X |

FOREIGN PATENTS OR APPLICATIONS

| | | |
|---|---|---|
| 978,657 | 12/1964 | Great Britain |

OTHER PUBLICATIONS

Axford, J. G. et al., Method of Using Redundancy in Very Large Computer Stores, In Proc. IEE (118)10, p. 1383–1391, Oct. 1971.

*Primary Examiner*—Malcolm A. Morrison
*Assistant Examiner*—R. Stephen Dildine, Jr.

[57] ABSTRACT

An information storage arrangement is described in which the storage functions can readily be monitored. The storage comprises a plurality of functionally autonomous storage blocks. The blocks are connected to common supply lines, over which signals corresponding to the function being monitored are carried. A first verifier circuit is connected to the common supply lines following the point at which the last storage block is connected to these supply lines. The storage blocks are constructed to individually store only such small portions of the stored information that functional errors occurring in a storage block or the individual lines supplying it from the common supply lines affect only small parts of the total stored information. The portion of the stored information affected is so small that errors from individual storage blocks, or their individual circuitry, do not compensate one another, so that an error will not go undetected by a second verifier connected to each of the output lines from the individual storage blocks.

6 Claims, 3 Drawing Figures

INFORMATION STORAGE HAVING MONITORED FUNCTIONS

BACKGROUND OF THE INVENTION

In telecommunication switching systems having a stored program central control, as well as in other data processing systems wherein there is a great requirement for reliability in operation, particular importance is attached to the monitoring of the functions of the information storage included in such systems.

Above all, particular attention is paid to the monitoring of errors of the first order, i.e., errors resulting from a complete failure or complete functional incapacity of a single component. When a storage is monitored for such errors, it is generally not sufficient to monitor only its inputs and outputs. Errors of the first order can cause, at the output, multiple errors which compensate one another with respect to the monitoring signals, and for this reason these errors could, under certain circumstances, not be detected. By way of example, an error in the addressing of the storage could lead to the selection of an erroneous storage location and, thus, for example, to the read-out of a faulty storage word without causing a verifier at the output end to detect the error, since the storage word read out is not in itself in error.

Errors, such as the above, that are incapable of being detected can be avoided, if the function of the central devices of the storage, e.g., of the address coder, are monitored separately. The amount of apparatus required therefor is considerable. Moreover, in the integrated semiconductor storages which are increasingly coming into use and in which the addressing devices are combined with one another to form a complete operative storage, access to the central devices is made difficult, or even impossible. Thus, the monitoring principles described above cannot be applied under certain circumstances.

An object of the invention is the provision of an information storage which provides for the possibility of monitoring the functions in question with little expenditure for apparatus.

An additional object is to achieve the above object taking into consideration the factors existing in integrated semiconductor storages in connection with the monitoring of the functions.

SUMMARY OF THE INVENTION

The invention concerns an information storage whose functions are monitored and which is characterized by the fact that it comprises storage blocks which are autonomous with respect to the functions to be monitored. The common supply lines associated with functions to be monitored have connected thereto a first verifier, behind the branch to the last storage block. These storage blocks are provided for storing such small partial information that individual functional errors within a storage block, or on the individual supply lines thereof, affect only such small parts of the information occurring on the output of the total storage that their falsifications do not sufficiently compensate one another, so that a result that is detectable as faulty at a second verifier connected to the output of the total storage.

The advantages of an effective monitoring of the functions of information storages requiring little apparatus are particularly evident in integrated semiconductor storages, since the decentralization, provided in accordance with the invention, of central devices in conventional, non-integrated storages is already provided to a certain extent in integrated storages. This results from the technology of integrated semiconductor storages.

In a further development of the invention, provision is made for monitoring operations in large storages without excessively increasing the amount of apparatus needed, even with decentralization.

BRIEF DESCRIPTION OF THE DRAWINGS

The principles of the invention will be most readily understood by reference to a detailed description, given below, of preferred embodiments constructed according to these principles. This description is illustrated by drawings which are briefly described as follows.

DETAILED DESCRIPTION OF THE DRAWINGS

Figure 1:
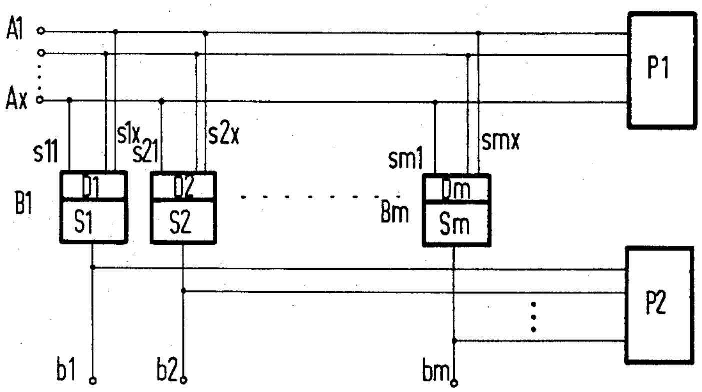
FIG. 1 is a block-schematic diagram of an information storage constructed according to the invention having a relatively small storage capacity.

In FIG. 1, as well as in the other figures, the information storage according to the invention is solely explained with regard to the monitoring of the addressing. If necessary, the concept of the storage construction in accordance with the invention may, of course, be extended to include operations to be monitored other than addressing, for example, the decoding of instructions or the supply of the clock pulse.

It is to be noted that this invention is not directed to the construction of the individual memory elements, e.g., the semiconductor memory blocks, and other individual elements, such as coders, decoders, verifiers and the like. Therefore, these elements are described only insofar as necessary to enable the selection of appropriate known devices to perform the described functions.

In the illustrations below like elements are indicated by like reference letters.

The information storage shown in FIG. 1 comprises m storage blocks B1, B2 to B*m* which are autonomous, at least with respect to the addressing. Thus, it comprises *m* storage blocks each having their own address supply lines s11 to smx, as well as their own address coders D1 to D*m*. In the example given, the storage media S1 to S*m* are constructed for storing *n* words of 1 bit each, where *n* stands for the word capacity of the total storage. The information storage described is thus constructed for storing *n* words of *m* bits each.

A first verifier P1 is connected following the branch to the last storage block B*m* to the address input lines A1 to A*x* and in common with all storage block. The individual address input lines s11 to sxm of the storage blocks branch off from the aforementioned address input lines. This verifier may, by way of example, be a parity network. A second verifier P2, which may likewise be a parity network, is connected to the outputs b1 to bm of the individual storage blocks B1 to B*m* supplying the bits 1 to *m*.

An error in the addresses coupled to the address input lines A1 to A*x* is detected and signalled by the verifier P1. Due to the arrangement of this verifier P1 behind the branch to the last storage block, it is, furthermore, assured that errors caused by interruption of the segments of the address input lines A1 to A*x*, lying between individual branches, are detected. Thus, if verifier P1 does not respond, it may be assumed that the same addresses have been coupled to the individual address input lines s11 to smx of all the storage blocks B1 to B*m*. If an error occurs on one of the individual supply lines of the storage blocks or within the individual storage blocks, whether it be in the individual decoder D or in the storage location S itself, only one bit is affected by this error during the read-out from the storage. Assuming that the information read out was provided, with a parity bit, this error is in all cases detected by the second verifier P2 where it leads to a falsification of the word read out. Therefore, in this invention an error of the first order will not disturb, simultaneously, several bits of the word read out. If such a disturbance did occur, this could result in the errors of the individual bits compensating one another such that they are no longer detectable by a parity check.

Figure 2:
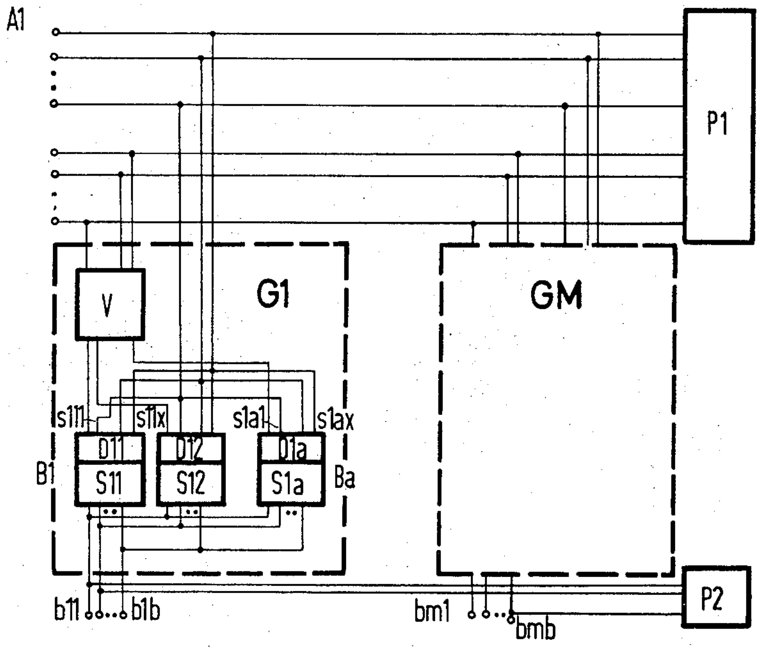
FIG. 2 is a block-schematic diagram of a first embodiment of a large capacity storage constructed according to the invention and FIG. 3 is a block-schematic diagram of a second embodiment of a large capacity storage constructed according to the invention.

FIG. 2 shows an alternative preferred embodiment of the information storage according to the invention which may be employed whenever storages must be constructed having a word capacity, which is a multiple of the word capacity of a single storage block and which is used in conjunction with storage words coded in a code, which will be discussed in detail hereinbelow.

In the storage shown in FIG. 2, the storage blocks are divided into *m* storage block groups G1 to G*m*, of which only the storage block group G1 is shown in detail. Each of these storage block groups comprises a number of storage blocks which, as in the embodiment described in connection with FIG. 1, are operative by themselves, for example, with respect to the addressing, but which, unlike the FIG. 1 embodiment, are used to store *n* words having more than one bit, namely *b* bits. The total number of words of a storage, so constructed, is obtained as the product of the number *a* of the storage blocks of each group and the number *n* of the words that can be stored in a single block. The total number of bits of the storage word is obtained as the product of the number of bits *b* of the words storable in an individual storage block and the number *m* of the storage block groups.

Each of the storage block groups G1 to G*m* has an advance decoder V of known construction for the purpose of selecting the individual storage blocks within the storage block groups. To achieve this purpose, the advance decoder converts into a one-out-of-a code the storage block addresses occurring on the block address lines A*b*1 to A*bx*, common to all the storage block groups. Accordingly, the inputs of the advance decoder of the individual storage block groups are connected to the block address lines A*b*1 to A*bx*. The outputs of each of the advance decoders are connected, respectively, to the inputs of decoders D11 to D1*a* of the storage block group concerned. Branches lead from the word address lines A1 to A*x*, common to all storage blocks, to the individual storage block groups or to the word address input lines s111 to s1ax, in each block. Following the branch of the address lines A1 to A*x* or Ab1 to Abx connected to the last storage block group Gm is connected a first verifier P1, which may be a parity network, as described in connection with FIG. 1.

Coordinated outputs of the storage blocks of a storage block group are connected with one another, each representing a storage output b11 to bmb of the storage.

The operations for monitoring the storage according to the invention shown in FIG. 2 are basically the same as those described in connection with FIG. 1. The word address lines A1 to A*x* common to all storage blocks or storage block groups and storage block address lines A*b*1, A*bx* are monitored by the first verifier P1, for example, by using a parity check. If no error signal is delivered by this verifier, it is certain that the same addresses have been coupled to all block groups. In the arrangement according to the invention, due to the fact that in the individual storage, block words having *b* bits can now be stored, an error of the first order on an individual storage supply line, in the decoder in question or in lines within the storage medium may lead to a multiple error, which may affect up to *b* bits. Therefore, in the case of this embodiment of the storage according to the invention, in order to ensure safe monitoring, the words to be stored must be coded in a code with which group errors having a maximum length of *b* bits can be detected. Consequently, the second verifier P2, too, must be constructed for detecting such signals.

If, for example, the stored words having a length which is the product of *b* times *m* is divided into *b* partial words having a length *m*, and a parity bit is assigned to each of these partial words (with the bit positions *b*11, *b*21, to *bm*1; *b*21, *b*22 to *bm*2 etc., to *b*1*b*, *b*2*b* to *bmb*), the verifier P2 may comprise a parity network constituted by *b* partial networks, with which the partial words are checked for the correct parity.

Figure 3:
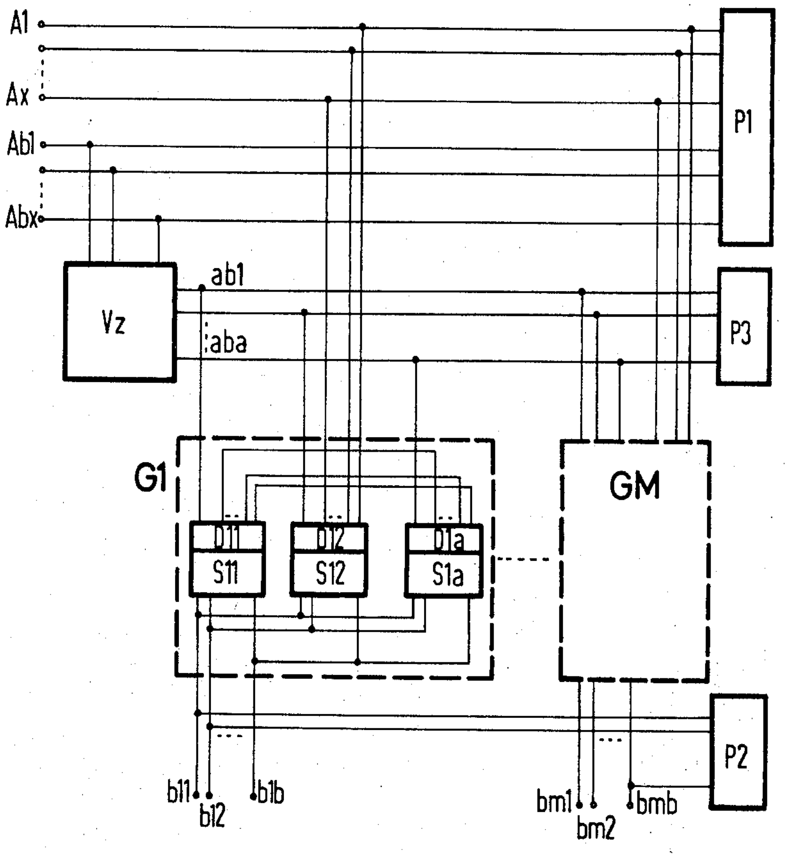

FIG. 3 shows a modified form of the storage according to FIG. 2. The grouping of the storage blocks in this arrangement is the same as the one described in FIG. 2. The difference with the storage illustrated in FIG. 2 lies in the fact that instead of using an individual decoder V for each storage group, this embodiment has a single central advance decoder VZ. Decoder VZ has address lines ab1 to aba common to all groups, and it converts the storage block addresses in the 1-out-of-a code. The address lines ab1 to aba are monitored by a third verifier P3, which performs a 1-out-of-a check. This checking circuit is connected following the branch of the address lines of the last storage block group G*m* to the storage block address lines *ab*1 to *aba*.

Errors of addressing affecting a plurality of block groups are detected by the verifiers P1 and P3, and errors occurring on individual storage block address supply lines or within the storage blocks are detected by verifier P2 under the conditions set forth in connection with FIG. 2 with respect to the code employed.

The grouping of the storage blocks explained with the aid of the storage structures shown in FIGS. 2 and 3 may also be used to advantage, if the individual storage blocks store words having only one bit each, in the same manner as in the FIG. 1 embodiment.

The principles of this invention have been described in terms of three preferred embodiments, which description is not to be considered as limiting. These embodiments may be modified or changed, but still be within the scope of the invention, as defined by the appended claims.

We claim:

1. A storage arrangement for facilitating the monitoring of storage functions, comprising:
   a plurality of storage blocks, each of which functions autonomously, at least as to the functions to be monitored,
   a plurality of common information supply lines,
   a plurality of individual supply lines connecting each of said storage blocks to said common supply lines in a parallel arrangement,
   first verifier circuit means connected to said common supply lines after the last of the connections of said individual supply lines to said common supply lines, for detecting the presence of erroneous information signals on said common supply lines,
   a plurality of output lines, one of which is connected to an output terminal of each said storage block and
   second verifier circuit means connected to each of said output lines for detecting errors occurring in at least one of said individual supply lines or in at least one of said storage blocks,
   each said storage block being formed to store a sufficiently small portion of the total information stored in said storage arrangement such that individual errors occurring in said storage blocks or in said individual supply lines or a combination of the two will not compensate one another, because the errors are a sufficiently small part of the total information stored, and thereby the aforementioned errors are detectable by said second verifier circuit means.

2. The storage arrangement defined in claim 1 wherein the number of said storage blocks corresponds to the number of bits in each of the words to be stored, each of said storage blocks having capacity in bits equal to the number of words to be stored in the storage arrangement.

3. The storage arrangement defined in claim 2 wherein said storage blocks are formed into a number of groups and further comprising:
   individual decoder means coupled to each said storage block group for selection of a storage block in that group according to information received on said common supply lines.

4. The storage arrangement defined in claim 2 wherein said storage blocks are formed into groups and further comprising:
   central decoder means connected to each of said storage block groups for selecting corresponding storage blocks in each group responsive to information on said common supply lines and
   third verifier circuit means connected to said central decoder for detecting errors in information transmitted from said central decoder to said storage block groups.

5. The storage arrangement defined in claim 1 wherein said storage blocks are formed into a plurality of groups, wherein each said storage block stores a number *b* bits and wherein the number of storage block groups (*m*) times the number of bits (*b*) in each said storage block yields as a product the total number of bits in a storage word, each said storage block group having a number *a* of storage blocks and each said storage block storing a number *n* of words, the product of *a* times *n* being the total number of words in said storage arrangement and further comprising:
   individual decoder means connected to each said storage block group for selecting a storage block in the group responsive to information on said common supply lines.

6. The storage arrangement defined in claim 1 wherien said storage blocks are formed into a number *m* of storage block groups, each said storage block being adapted to store a number *b* of bits, the product of *b* times *m* yielding the number of bits in a storage word, and wherein each said group has a number *a* of storage blocks, each said storage block having a capacity of *n* storage words, the product of *a* times *n* yielding the word capacity of said storage arrangement and further comprising:
   central decoder means connected to each said storage block group for selecting a corresponding storage block in each group and
   third verifier circuit means connected to said central decoder means for detecting errors in information transmitted from said central decoder to said storage block groups.

* * * * *